United States Patent
Lu et al.

(10) Patent No.: US 9,074,863 B2
(45) Date of Patent: Jul. 7, 2015

(54) HEIGHT MEASURING DEVICE FOR WORKPIECES

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Jian-Qiang Lu, Jiashan (CN); Jian-Hua Xu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 124 days.

(21) Appl. No.: 13/945,155

(22) Filed: Jul. 18, 2013

(65) Prior Publication Data

US 2014/0033555 A1    Feb. 6, 2014

(30) Foreign Application Priority Data

Aug. 3, 2012   (CN) .................... 2012 2 3830227 U

(51) Int. Cl.
G01B 5/06 (2006.01)
(52) U.S. Cl.
CPC ...................... G01B 5/061 (2013.01)
(58) Field of Classification Search
CPC ........... G01B 3/22; G01B 5/061; G01B 5/063
USPC .................... 33/1 BB, 573, 832, 833, 836
See application file for complete search history.

(56) References Cited

U.S. PATENT DOCUMENTS

| | | | | |
|---|---|---|---|---|
| 4,524,525 A * | 6/1985 | Finkler | ....................... | 33/544.4 |
| 5,097,604 A * | 3/1992 | Brown | .......................... | 33/832 |
| 6,415,526 B1 * | 7/2002 | Buckner et al. | ................ | 33/833 |
| 6,446,351 B1 * | 9/2002 | Zhang et al. | ................... | 33/832 |
| 6,467,184 B1 * | 10/2002 | Wust et al. | ..................... | 33/832 |
| 7,263,786 B1 * | 9/2007 | Zanier | ............................ | 33/832 |
| 2004/0267496 A1 * | 12/2004 | Biggs et al. | ................... | 702/170 |
| 2006/0137204 A1 * | 6/2006 | Yang | ............................. | 33/832 |
| 2008/0127503 A1 * | 6/2008 | St. Louis et al. | ............... | 33/833 |
| 2009/0038169 A1 * | 2/2009 | Lee | ................................ | 33/507 |
| 2010/0287786 A1 * | 11/2010 | Biselx | ........................... | 33/832 |

* cited by examiner

*Primary Examiner* — G. Bradley Bennett
(74) *Attorney, Agent, or Firm* — Novak Druce Connolly Bove + Quigg LLP

(57) ABSTRACT

A height measuring includes a mounting base, a measuring mechanism, and a controller. The measuring mechanism includes a driving member, a measuring member, and a sensor. The driving member is mounted onto the mounting base. The sensor is positioned on the driving member. The measuring member is movably positioned on the driving member and passes through the sensor. The driving member is configured to drive the measuring member to move until it contacts a workpiece in a jig. The controller is electrically connected to the sensor and prestores a moving distance range. The sensor is configured to sense a moving distance of the measuring member and transmit the moving distance to the controller. The controller is configured to judge whether or not the workpiece reaches a proper height relative to the jig by comparing the moving distance data with the prestored distance range.

18 Claims, 2 Drawing Sheets

HEIGHT MEASURING DEVICE FOR WORKPIECES

BACKGROUND

1. Technical Field

The present disclosure relates to height measuring devices, and particularly to a height measuring device for measuring a height of a workpiece relative to a jig so that height inspection results for the workpiece can be obtained and indicated.

2. Description of Related Art

Workpieces may be installed in a jig for machining automatically. In order to insure precise machining of the workpiece, a machining height of the workpiece needs to be configured at a proper height relative to the jig. An incorrect machining height of the workpiece may be caused by an improper size of the workpiece. Workpieces are visually inspected in the jigs to make sure they reach the proper machining height. However, it is time consuming to visually inspect whether the workpieces are at the proper height.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
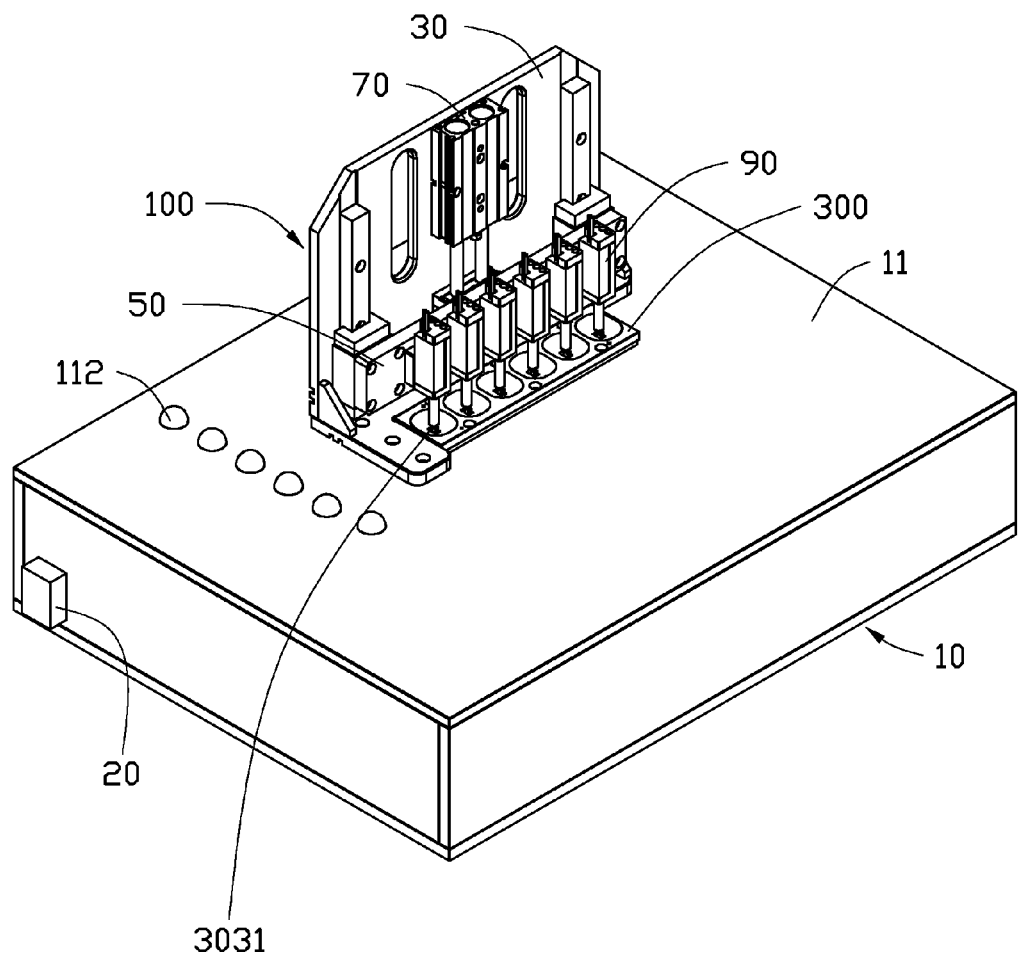
FIG. 1 is an assembled, isometric view of an embodiment of a height measuring device.
Figure 2:
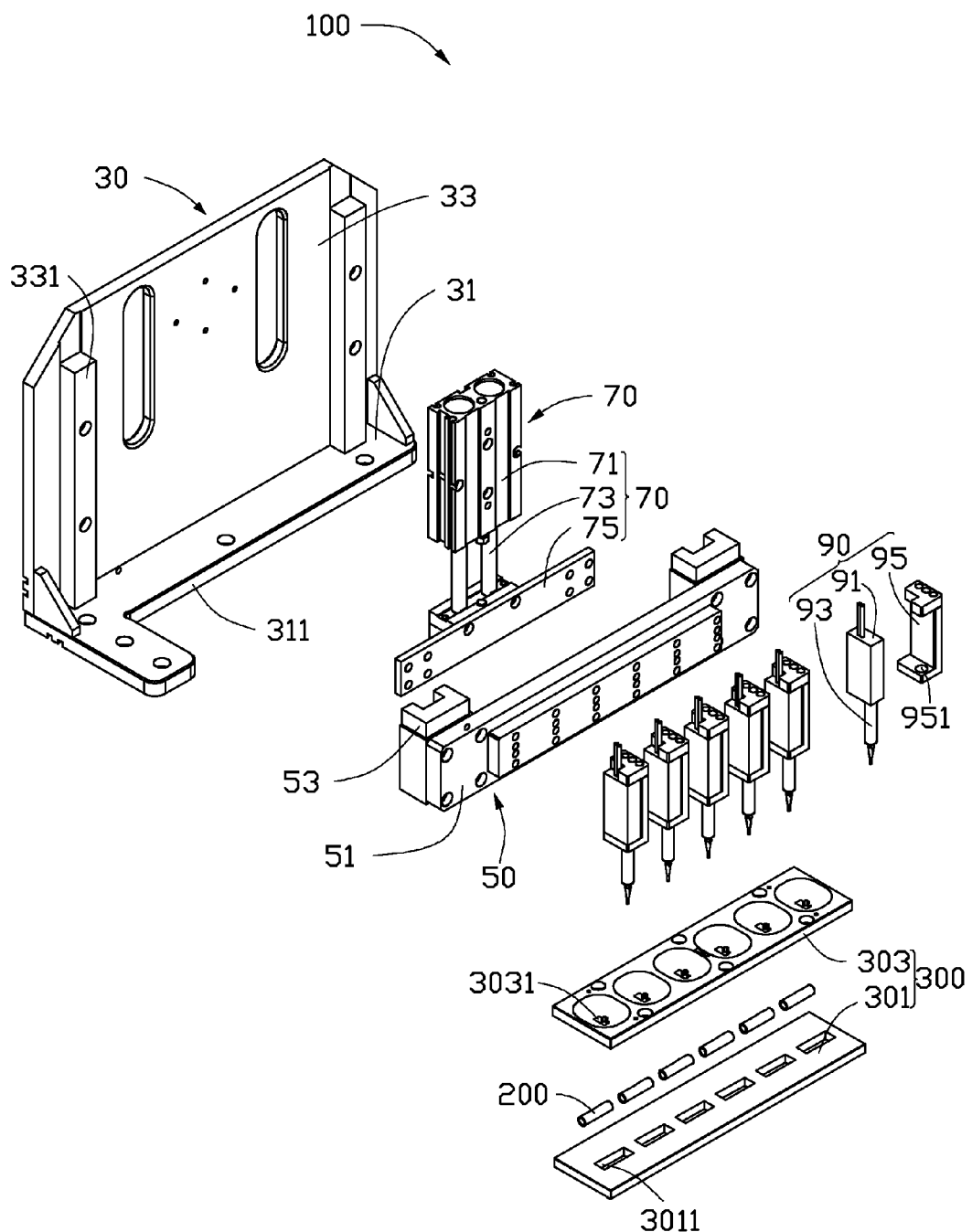
FIG. 2 is a partly exploded view of the height measuring device in FIG. 1.

FIGS. 1 and 2 show one embodiment of a height measuring device 100. The height measuring device 100 is configured to automatically measure whether or not a height of a workpiece 200 is acceptable relative to a jig 300. In the illustrated embodiment, the workpiece 200 is substantially cylindrical, and six workpieces 200 are positioned in the jig 300 for measuring of the height thereof. The jig 300 includes a base body 301 and a positioning plate 303 positioned above the base body 301. The base body 301 defines six mounting grooves 3011. The workpieces 200 are received and positioned in the corresponding mounting grooves 3011, respectively. The positioning plate 303 covers the base body 301 to cooperatively position the workpieces 200. The positioning plate 303 defines six measuring holes 3031 corresponding to the six mounting grooves 3011, respectively. The measuring holes 3031 are configured to allow a portion of the height measuring device 100 to pass through to measure the height of the workpieces 200 sandwiched between the base body 301 and the positioning plate 303. In alternative embodiments, a number of the mounting grooves 3011 is at least one, and a number of the measuring holes 3031 is at least one correspondingly.

The height measuring device 100 includes a platform 10, a controller 20, a mounting base 30, a mounting plate 50, a driver 70, and six measuring mechanisms 90. The platform 10 is substantially a hollow cube and includes a fixing plate 11 on top thereof. The fixing plate 11 is configured to support the mounting base 30 and the jig 300. Six indicating lights 112 are installed on the fixing plate 11 corresponding to the six workpieces 200, respectively, for indicating whether or not the six workpieces 200 positioned in the jig 300 are each of acceptable height, respectively. In the illustrated embodiment, the six indicating lights 112 are arranged in a straight line.

The controller 20 is positioned adjacent to the platform 10 and electrically connected to the indicating lights 112. The controller 20 prestores data of a moving distance range between the measuring mechanism 90 and an accurately positioned workpiece.

The mounting base 30 is substantially L-shaped and is located on the fixing plate 11 of the platform 10. The mounting base 30 includes a positioning portion 31 and a mounting portion 33 perpendicularly connected to the positioning portion 31. The positioning portion 31 is mounted onto the fixing plate 11 adjacent to the indicating lights 112. The positioning portion 31 defines a position groove 311 at an end thereof away from the mounting portion 33. The base body 301 of the jig 300 is positioned in the position groove 311. The mounting portion 33 is arranged perpendicular to the fixing plate 11. A pair of guiding portions 331 protrudes from two ends of the mounting portion 33, respectively, and is perpendicularly connected to the positioning portion 31 adjacent to the position groove 311. The guiding portions 331 are bars, and are parallel to each other.

The mounting plate 50 is movably mounted on the guiding portions 331, and includes a main body 51 and a pair of sliding portions 53 positioned at two ends of the main body 51. The main body 51 is configured to mount the driver 70 and the measuring mechanisms 90. The sliding portions 53 are substantially U-shaped, and engaged with the pair of guiding portions 331 to enable the mounting plate 50 to slide along the guiding portions 331.

The driver 70 includes a driving body 71, a driving end 73 formed on the driving body 71, and a connecting portion 75 fixed on the driving end 73 away from the driving body 71. The driving body 71 is mounted onto the mounting portion 33, and is positioned between the guiding portions 331. The connecting portion 75 is connected to a side of the main body 51 adjacent to the mounting portion 33. The driving body 71 drives the driving end 73 to extend forward or outward, thereby driving the connecting portion 75 and the mounting plate 50 to move relative to the mounting base 30.

The six measuring mechanisms 90 are arranged on the main body 51, and are spaced apart. Each measuring mechanism 90 is electrically connected to the controller 20 and includes a driving member 91, a measuring member 93, and a sensor 95. The driving member 91 is fixed on a side of the main body 51 away from the mounting portion 33 for driving the measuring member 93. The measuring member 93 is movably mounted onto the driving member 91. The measuring member 93 is moved to abut against the workpiece 200. The sensor 95 is fixed to the driving member 91 and is electrically connected to the controller 20. The sensor 95 defines a through hole 951, and the measuring member 93 passes through the through hole 951. The sensor 95 is a displacement sensor in the illustrated embodiment. The sensor 95 senses a moving distance of the measuring member 93 according to a voltage difference of the measuring member 93, and transmits data for the moving distance to the controller 20. Thus, the controller 20 compares the moving distance data of the measuring member 93 with the prestored distance range to judge whether the measured workpiece 200 reaches the proper acceptable height relative to the jig or not. In other words, the height of the measured workpiece 200 is compared against the prestored distance range which are data for tolerance range being held as acceptable quality inspection specifications. The indicating lights 112 emit lights of different colors to indicate different inspection results of the controller 20. When the moving distance of the measuring member 93 is within the prestored distance range, the measured workpiece 200 is judged to reach the proper height relative to the jig (so as to pass quality inspection relating to the height of the workpiece relative to the jig), and the corresponding indicating light 112 lights up and emits a green light. When the moving distance is outside of the prestored distance range, the measured workpiece 200 is judged to not reach the proper height relative to the jig (so as to fail quality inspection relating to the height of the workpiece relative to the jig), and the corresponding indicating light 112 lights up and emits a red light. In alternative embodiments, a number of the measuring mechanisms 90 may be one or more than one.

In assembly, first, the positioning portion 31 is positioned onto the fixing plate 11. Second, the driver 70 is mounted onto the mounting portion 33. Third, the sliding portions 53 are engaged with the guiding portions 331, and the main body 51 is connected to the connecting portion 75. Fourth, the measuring mechanisms 90 are spacedly arranged on the main body 51 of the mounting plate 50.

In operation, first, six workpieces 200 are positioned in the mounting grooves 3011 of the base body 301, and the positioning plate 303 covers the base body 301, such that the workpieces 200 are partly exposed through the measuring holes 3031. Second, the jig 300 is mounted into the position groove 311, and each of the measuring holes 3031 is aligned with a corresponding measuring member 93 of the measuring mechanism 90. Third, the driver 70 drives the mounting plate 50 and the measuring mechanisms 90 to move towards the jig 300. Fourth, each of the driving members 91 drives the measuring member 93 to move towards the workpiece 200 until the measuring member 90 contact the workpiece 200. Simultaneously, the sensors 95 sense the moving distances of the corresponding measuring members 93 and transmit the moving distances of the measuring members 93 to the controller 20. Fifth, the controller 20 receives the moving distances of the measuring members 93 and judges whether or not each of the workpieces 200 reaches an acceptable height relative to the jigs according to and in comparison to the prestored moving distance range, respectively. The controller 20 controls the indicating lights 112 to light up correspondingly to indicate the inspection results.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A height measuring device, for measuring and indicating height inspection data for at least one workpiece positioned in a jig, comprising:
    a platform;
    a mounting base mounted on the platform;
    at least one measuring mechanism, the at least one measuring mechanism comprising a driving member, a measuring member, and a sensor; and
    a controller electrically connected to the sensor for receiving the moving distance of the measuring member form the sensor,
    wherein the driving member is mounted on the mounting base, the sensor is fixed to the driving member for sensing a moving distance of the measuring member, the measuring member is movably positioned on and driven by the driving member for a range of motion until contacting the at least one workpiece, and a prestored data of a moving distance range is stored and compared by the controller for judging whether a height of the at least one workpiece is of an acceptable height relative to the jig via comparing the moving distance data with the prestored data of the moving distance range.

2. The height measuring device of claim 1, wherein at least one indicating light is positioned on the platform, and electrically connected to the controller, the at least one indicating light indicates a plurality of inspection results of the controller.

3. The height measuring device of claim 2, wherein the at least one indicating light emits lights of different colors to indicate different inspection results of the controller.

4. The height measuring device of claim 1 further comprising a driver, the driver comprising a driving body and a driving end formed on the driving body, the driving body mounted on the mounting base, the driving member of the at least one measuring mechanism connected to the driving end, the driving body configured to drive the driving end and the at least one measuring mechanism to move towards the at least one workpiece.

5. The height measuring device of claim 4, wherein the driver further comprises a connecting portion connected to an end of the driving end away from the driving body, the driving member of the at least one mechanism is mounted on the connecting portion.

6. The height measuring device of claim 5, wherein the mounting base comprises a positioning portion and a mounting portion bent from the positioning portion, a pair of guiding portions protrude from the mounting portion, and parallel to each other, the pair of guiding portions are perpendicular to the positioning portion, the positioning portion is mounted on the platform, the height measuring device further comprises a mounting plate, the mounting plate is movably mounted on the pair of guiding portions, the connecting portion and the driving member of the at least one measuring mechanism are connected to the mounting plate.

7. The height measuring device of claim 6, wherein the mounting plate comprises a main body and a pair of sliding portions formed on the main body, the pair of sliding portions are movably engaged with the pair of guiding portions.

8. The height measuring device of claim 2, wherein the platform comprises a fixing plate, the mounting base is mounted on the fixing plate, the at least one indicating light is positioned on the fixing plate.

9. The height measuring device of claim 1, wherein the sensor defines a through hole, the measuring member passes through the through hole.

10. A height measuring device, for measuring and determining whether or not a height of at least one workpiece positioned in a jig is of an acceptable height, comprising:
    a mounting base;
    at least one measuring mechanism comprising a driving member, a measuring member, and a sensor, the driving member mounted on the mounting base, the sensor fixed to the driving member for sensing a moving distance of the measuring member, the measuring member movably positioned on the driving member, and passing through the sensor, the driving member configured to drive the measuring member to move until contacting the at least one workpiece; and
    a controller electrically connected to the sensor for receiving a moving distance data of the measuring member from the sensor, and storing a prestored data of a moving distance range and judging whether the at least one workpiece is positioned in an acceptable height in the jig by comparing the moving distance data of the measuring member with the prestored data of the moving distance range.

11. The height measuring device of claim 10 further comprising a platform and at least one indicating light positioned on the platform, the at least one indicating light electrically connected to the controller, the mounting base mounted on the platform, the at least one indicating light indicates a plurality of inspection results of the controller.

12. The height measuring device of claim 11, wherein the at least one indicating light emits lights of different colors to indicate different inspection results of the controller.

13. The height measuring device of claim 10 further comprising a driver, the driver comprising a driving body and a driving end formed on the driving body, the driving body mounted on the mounting base, the driving member of the at least one measuring mechanism connected to the driving end, the driving body configured to drive the driving end and the at least one measuring mechanism to move towards the at least one workpiece.

14. The height measuring device of claim 13, wherein the driver further comprises a connecting portion connected to an end of the driving end away from the driving body, the driving member of the at least one mechanism is mounted on the connecting portion.

15. The height measuring device of claim 14, wherein the mounting base comprises a positioning portion and a mounting portion bent from the positioning portion, a pair of guiding portions protrude from the mounting portion, and parallel to each other, the pair of guiding portions are perpendicular to the positioning portion, the positioning portion is mounted on the platform, the height measuring device further comprises a mounting plate, the mounting plate is movably mounted on the pair of guiding portions, the connecting portion and the driving member of the at least one measuring mechanism are connected to the mounting plate.

16. The height measuring device of claim 15, wherein the mounting plate comprises a main body and a pair of sliding portions formed on the main body, the pair of sliding portions are movably engaged with the pair of guiding portions.

17. The height measuring device of claim 11, wherein the platform comprises a fixing plate, the mounting base is mounted on the fixing plate, the at least one indicating light is positioned on the fixing plate.

18. The height measuring device of claim 10, wherein the sensor defines a through hole, the measuring member passes through the through hole.

\* \* \* \* \*